(12) United States Patent
Okubo (10) Patent No.: US 7,327,881 B2
(45) Date of Patent: Feb. 5, 2008

(54) IMAGE READING APPARATUS (75) Inventor: Nobuyuki Okubo, Kanazawa (JP)

(73) Assignee: PFU Limited, Ishikawa (JP)

( * ) Notice: Subject to any disclaimer, the term of this patent is extended or adjusted under 35 U.S.C. 154(b) by 867 days.

(21) Appl. No.: 10/791,797

(22) Filed: Mar. 4, 2004

(65) Prior Publication Data

US 2004/0179734 A1    Sep. 16, 2004

(30) Foreign Application Priority Data

Mar. 14, 2003  (JP)  ............................. 2003-069272

(51) Int. Cl.
G06K 9/34  (2006.01)

(52) U.S. Cl. .................. 382/180; 382/173; 382/177; 382/178; 382/179; 382/182; 382/183; 382/185; 382/284

(58) Field of Classification Search ............... 382/173, 382/177, 178, 179, 180, 182, 183, 185, 284
See application file for complete search history.

(56) References Cited

U.S. PATENT DOCUMENTS 5,923,790 A * 7/1999 Miwa et al. ............... 382/289
6,212,299 B1 * 4/2001 Yuge ........................ 382/231
6,226,403 B1 * 5/2001 Parthasarathy ............ 382/187

\* cited by examiner

Primary Examiner—Jingge Wu
Assistant Examiner—Bernard Krasnic (57) ABSTRACT

A labeling process unit groups a continuous black pixel area as one group in the binary image data read by an image input device, and extracts the group bounding rectangle information about the group. A row extracting process unit extracts row rectangle information from the position information about the extracted group bounding rectangle. An overlap integrating process unit determines the overlap between the group bounding rectangles contained in the extracted row rectangle, and performs an overlap integrating process of integrating overlapping groups into one group. The ratio of the number of group bounding rectangles contained in the row rectangle before performing the overlap integrating process to the number of the group bounding rectangles contained in the row rectangle after performing the overlap integrating process is obtained, and the language of the characters written in the original is determined based on the difference in ratio.

7 Claims, 7 Drawing Sheets

NUMBER A IS 21

NUMBER B IS 21

FIG. 6B

NUMBER A IS 17

NUMBER B IS 9

IMAGE READING APPARATUS

BACKGROUND OF THE INVENTION

1. Field of the Invention

This invention relates to an image reading apparatus, and more particularly to an image reading apparatus to read an image which contains character information and to easily determine the language of the original based from the characteristic of the image information of the original.

2. Description of the Related Art

When characters are recognized in the image reading apparatus using an OCR (optical character reader), etc., the OCR engine is necessarily used for each language of the characters contained in the original to be read. To attain this, the language of the character in the original to be read is manually set in advance by the user of the apparatus before a read. Therefore, the user has the problem that the apparatus is not easily operable.

To solve the problem, an apparatus for automatically determining a language has been suggested by loading OCR engines for a plurality of languages on the OCR, actually recognizing the characters in an original using the OCR engine for each language, selecting the language having the highest probability of correct determination (for example, patent document #1: Japanese Patent Application Laid-Open No. 6-150061).

Figure 7:
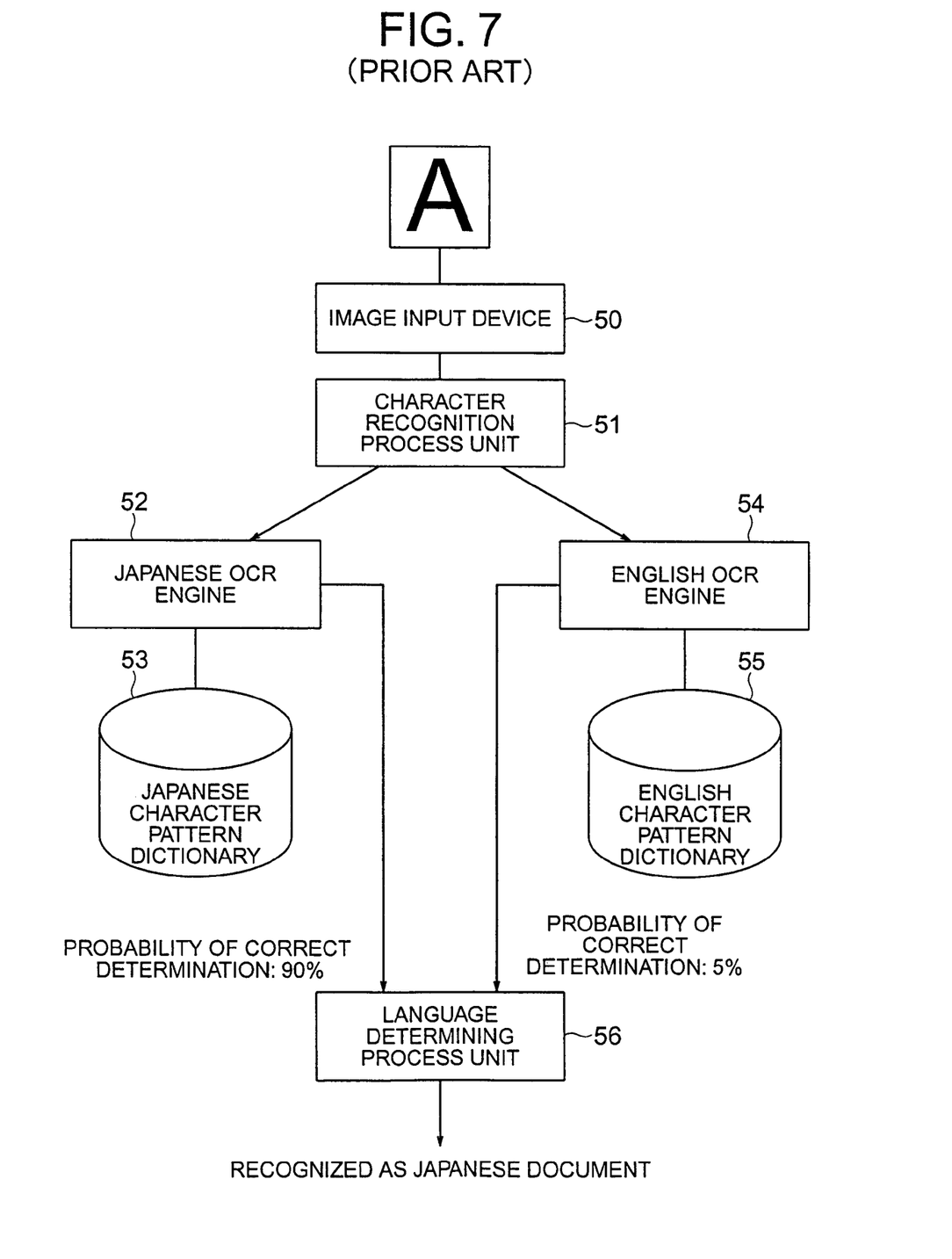
FIG. 7 is an explanatory view of the conventional determining process of the language of the characters contained in an original.

This is as shown in FIG. 7. That is, an image input device 50 reads a character written in an original as image data, and transmits the data to a character recognition process unit 51. The character recognition process unit 51 has a plurality of OCR engines for a plurality of languages for character recognition. For example, as shown in FIG. 7, a Japanese OCR engine 52 performs a pattern matching process between the received image data and the character pattern in a Japanese character pattern dictionary 53, thereby executing character recognition. Then, an English OCR engine 54 performs a pattern matching process between the same image data and the character pattern in an English character pattern dictionary 55 to recognize characters. From the result of the character recognition by the OCR engine of each language, the probability of correct determination indicating the probability of correct recognition is obtained, and is transmitted to a language determining process unit 56. Based on the probability of correct recognition transmitted from the OCR engines for a plurality of languages, the language determining process unit 56 determines the language of the highest probability of correct recognition as the language of the characters contained in the original.

In addition, to prevent wrong determination, a similar determining process is performed on a plurality of characters contained in the original, and a statistical process is also performed to determine the language of the highest probability of the language of the characters contained in the original as the language of the characters contained in the original.

However, in such apparatus, since character recognition and determination are repeatedly performed by the a plurality of OCR engines for a plurality of languages, the process requires a long processing time.

Furthermore, the above-mentioned language determining process is to be performed as a preprocess for character recognition. Then, it is desired to realize the function by hardware to complete the process within a shortest possible time. However, it is very hard to realize the function of the plurality of OCR engines for a plurality of languages and the character pattern dictionaries for the languages by hardware.

As described above, the conventional technology has the following problem. That is, when an image reading apparatus recognizes a character using an OCR, etc., it is necessary to use an OCR engine specialized for the language to be recognized or used in an original. Therefore, a user manually sets the language of the original when an image is read, so that it is troublesome for the user to operate such apparatus.

To solve the problem, there has been an apparatus suggested for automatically determining the language of the characters contained in an original by loading a plurality of OCR engines for a plurality of languages, performing character recognition by the OCR engines for the respective languages, and selecting a language of the highest probability of correct determination, thereby automatically determining the language of the characters contained in the original.

However, the apparatus has to actually perform character recognition by the plurality of OCR engines for the plurality of languages each time an original is read, and requires a long processing time. Furthermore, to shorten the processing time, it is preferable to realize the function by hardware, but it is hard to realize the OCR capability by hardware.

SUMMARY OF THE INVENTION

It is an object of the present invention to provide an image reading apparatus capable of easily and automatically determining a language of the characters contained in an original without performing character recognition using an OCR, etc.

To solve the above-mentioned problem, an image reading apparatus of the present invention includes labeling process unit, overlap integrating process unit and language determining process unit. The labeling process unit groups a continuous black pixel area from binarized monochrome image, and extracts group bounding rectangle information containing the grouped continuous black pixel area for each group. The overlap integrating process unit determines the overlap between the group bounding rectangles contained in the row rectangles, and integrates the overlapping group bounding rectangles into one group bounding rectangle. The language determining process unit obtains a ratio of the number of group bounding rectangles contained in the row rectangle before performing an overlap integrating process to the number of group bounding rectangles contained in the row rectangle after performing the overlap integrating process, and determines a language based on the ratio.

Preferably the image reading apparatus of the present invention further includes row extracting process unit which analogizes a sequence of characters in the original from the position relationship of the group bounding rectangle, detects a row, and extracts row rectangle information when graphics and pictures are contained in a document to be read.

Preferably the image reading apparatus of the present invention further includes binarizing process unit which converts image data input through an image input device such as a CCD into binary image data of two gray levels of black and white when the input image data is multi-valued image data.

Preferably the image reading apparatus of the present invention further includes statistical determination process unit which performs the above-mentioned determining process on all rows contained in the original, performs a statistical process so that the language determined to be the language of the characters contained in the most rows can be selected as the language of the characters contained in the original.

When a document to be read contains only characters, the labeling process, the overlap integrating process, and the language determining process can be performed on the entire original.

DETAILED DESCRIPTION OF THE PREFERRED EMBODIMENTS

The present invention is embodied as follows. The image reading apparatus of the present invention has a binarizing process unit. When the image data input from an image input device such as a CCD is multi-valued image data, the binarizing process unit converts the image data into monochrome binary image data or the data of two levels of black and white. Thus, although the image data read by an image input device is the data of a color image or a multilevel gray scale image, the subsequent image processing such as the labeling process, etc. can be simplified.

The image reading apparatus has a labeling process unit which groups a continuous black pixel area from binarized monochrome image by determining a sequence of black pixels, and extracts group bounding rectangle information containing the grouped continuous black pixel area for each group. Thus, a continuous area of character components of lines, dot, etc. forming a character can be grouped, and group bounding rectangle information can be obtained for each group.

The image reading apparatus has a row extracting process unit. When graphics and pictures are contained in a document to be read, the row extracting process unit extracts row rectangle information by determining the position relationship of each group bounding rectangle based on the group bounding rectangle information extracted by the labeling process unit. This prevents an occurrence of wrong determination by determining a language by processing the graphics and pictures contained in a document to be read as well as the characters. Thus, only the characters are processed when determining a language.

The image reading apparatus has a overlap integrating process unit which determines the overlap between the group bounding rectangles contained in the row rectangles, and integrates the overlapping group bounding rectangles into one group bounding rectangle when the overlap between the group bounding rectangles is detected, thereby extracting a group bounding rectangle. Some languages such as Japanese has the feature that lines and dots forming single character are separated each other. Thus, a larger number of groups can be integrated for Japanese than for English, etc. by the overlap integrating process unit. This integrating process realizes the effect of extracting the feature of a language for identification of a language.

The image reading apparatus has a language determining process unit which obtains a ratio of the number of group bounding rectangles contained in the row rectangle before performing an overlap integrating process to the number of group bounding rectangles contained in the row rectangle after performing the overlap integrating process, and determines a language of the characters contained in the row based on the overlap integration ratio. Thus, a language can be determined based on the differences in overlap integration ratio among languages.

The image reading apparatus has a statistical determination process unit which performs the above-mentioned determining process on all rows contained in the original, performs a statistical process so that the language determined to be the language of the characters contained in the most rows can be selected as the language of the characters contained in the original. Thus, although wrong determination occurs depending on the character data in the row contained in an original, a final mistake in automatic determination of a language can be avoided by performing the language determining process on a plurality of rows, thereby successfully performing the automatically determination of a language with a higher probability of correct determination.

When a document to be read contains only characters, the labeling process, the overlap integrating process, and the language determining process can be performed on the entire original.

Described below are the typical embodiments of the present invention. In the following explanation, the same component is assigned the same reference numeral, and the detailed explanation can be omitted for suppression of overlapping descriptions.

The present image reading apparatus can automatically determine a language of the characters contained in the document image data read by an image input device such as a CCD, etc.

Figure 1:
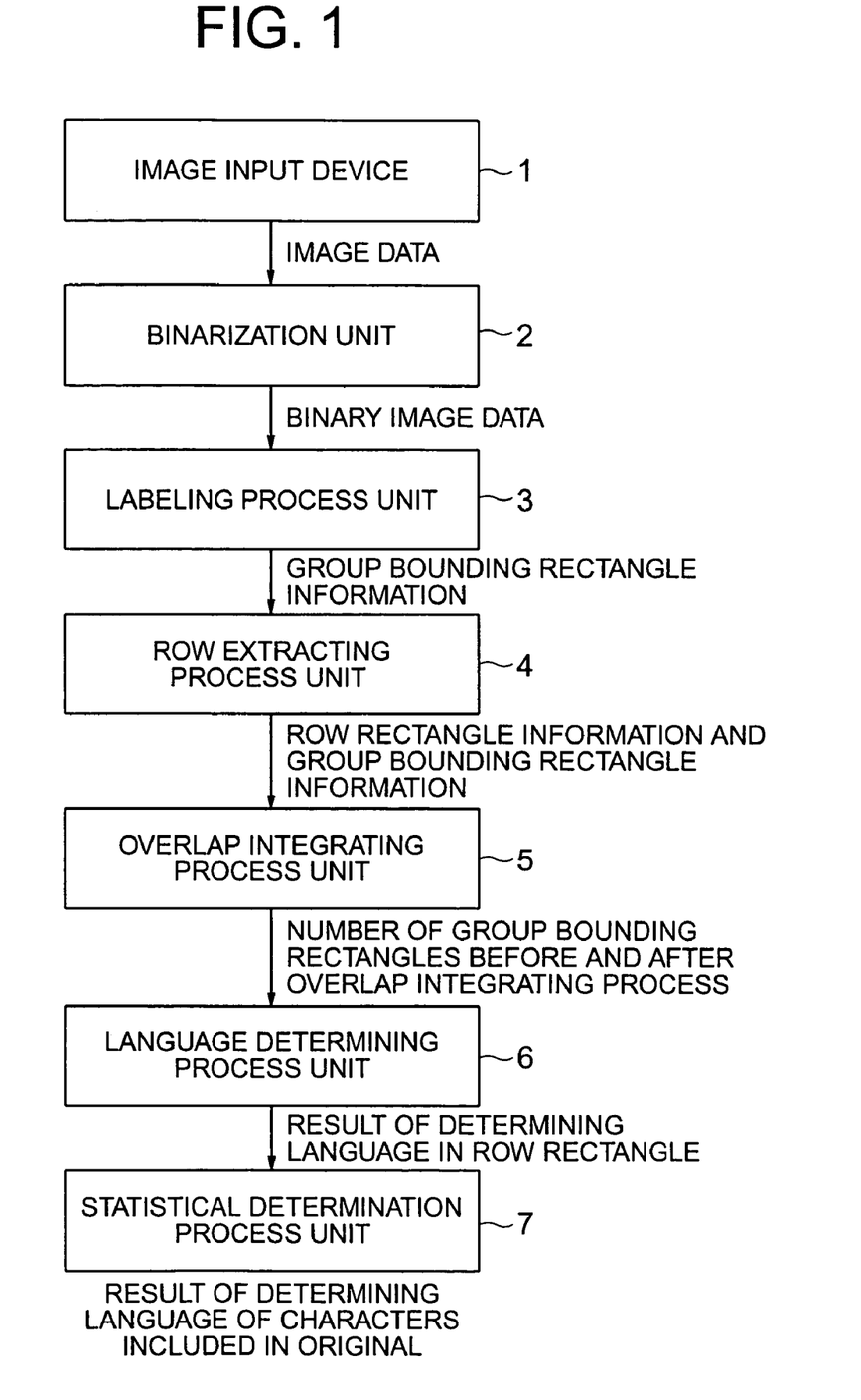
FIG. 1 shows the configuration of the present invention.

As shown in FIG. 1, the image reading apparatus has an image input device 1 such as a CCD, etc., and reads an image of an original as electronic data. The image input device 1 may read or input a color or multilevel gray scale image. In this case, the read image data is represented by multivalues (8 bits, 24 bits, etc.) for information per pixel.

A binarization unit 2 converts the multivalued image data into binary image data of a monochrome image. The binarizing process is performed by a method in which the brightness of a pixel represented by multi-values is defined as 1 when it is equal to or larger than a predetermined threshold, and as 0 when it is smaller than the threshold.

The monochrome image data converted into binary data is transmitted to a labeling process unit 3 which executes a labeling process of grouping a continuous black pixel area.

Figure 2A:
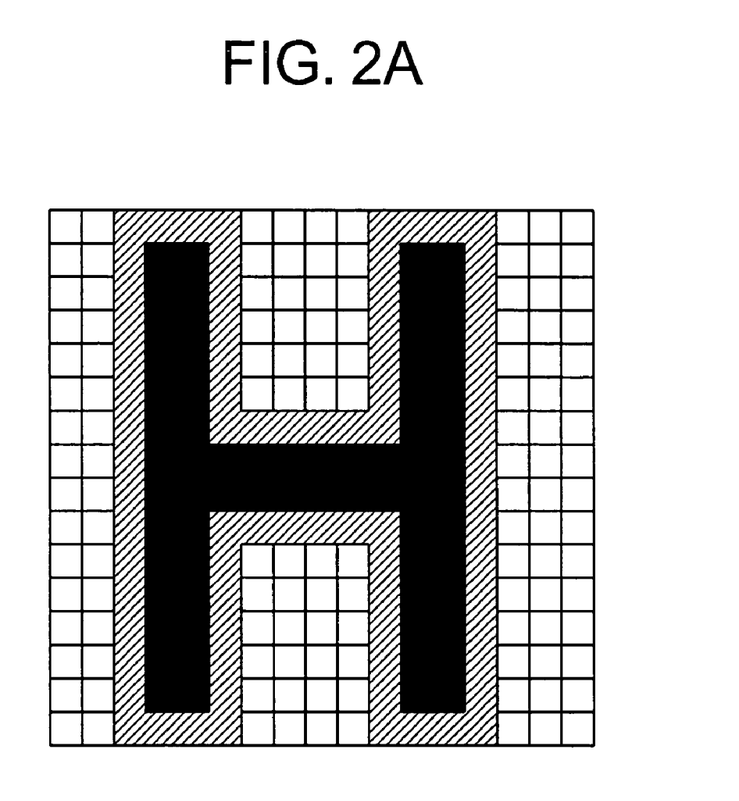
FIGS. 2A and 2B are an explanatory view of the labeling process.
Figure 2B:
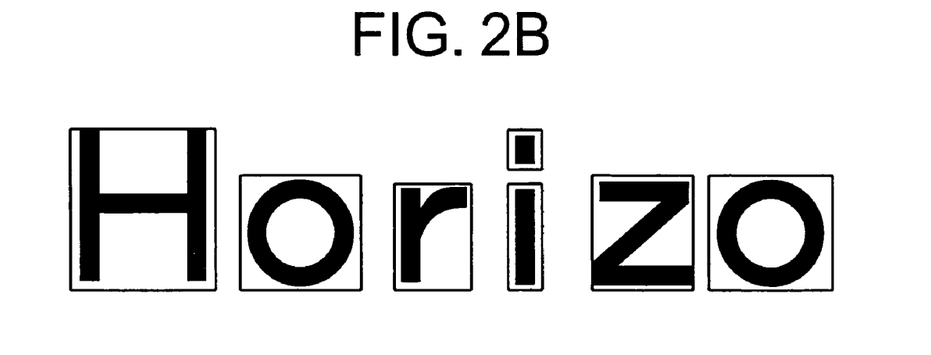

The labeling process is as follows. First, as shown in FIG. 2A, a sequence of black pixels is determined and grouped the continuous black pixel area as one unit, as indicated by a range enclosed by the diagonal lines in FIG. 2A. Then, as shown in FIG. 2B, bounding rectangle in a continuous black pixel area is extracted for each group to obtain group bounding rectangle information for each grouped continuous black pixel area.

When a document to be read contains graphics, pictures, etc., it is desired to use group bounding rectangles which contain characters only, since the rectangles are used for determination of language. Therefore, a row extracting process unit 4 is provided to extract a row formed by only characters based on the position information of the group bounding rectangle extracted in the labeling process.

Figure 3:
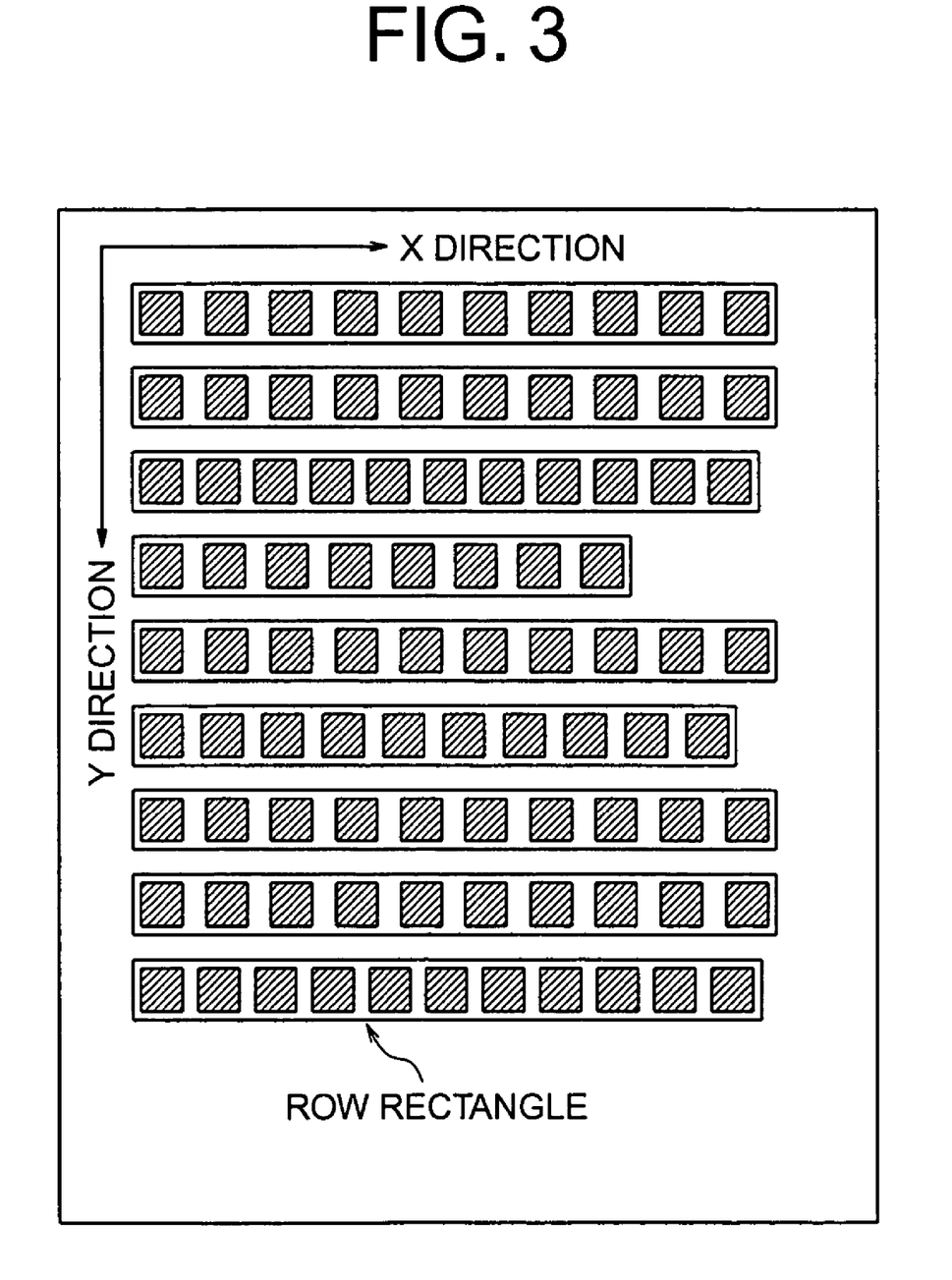
FIG. 3 is an explanatory view of the case in which group bounding rectangles are linearly arranged in the X direction.
Figure 4:
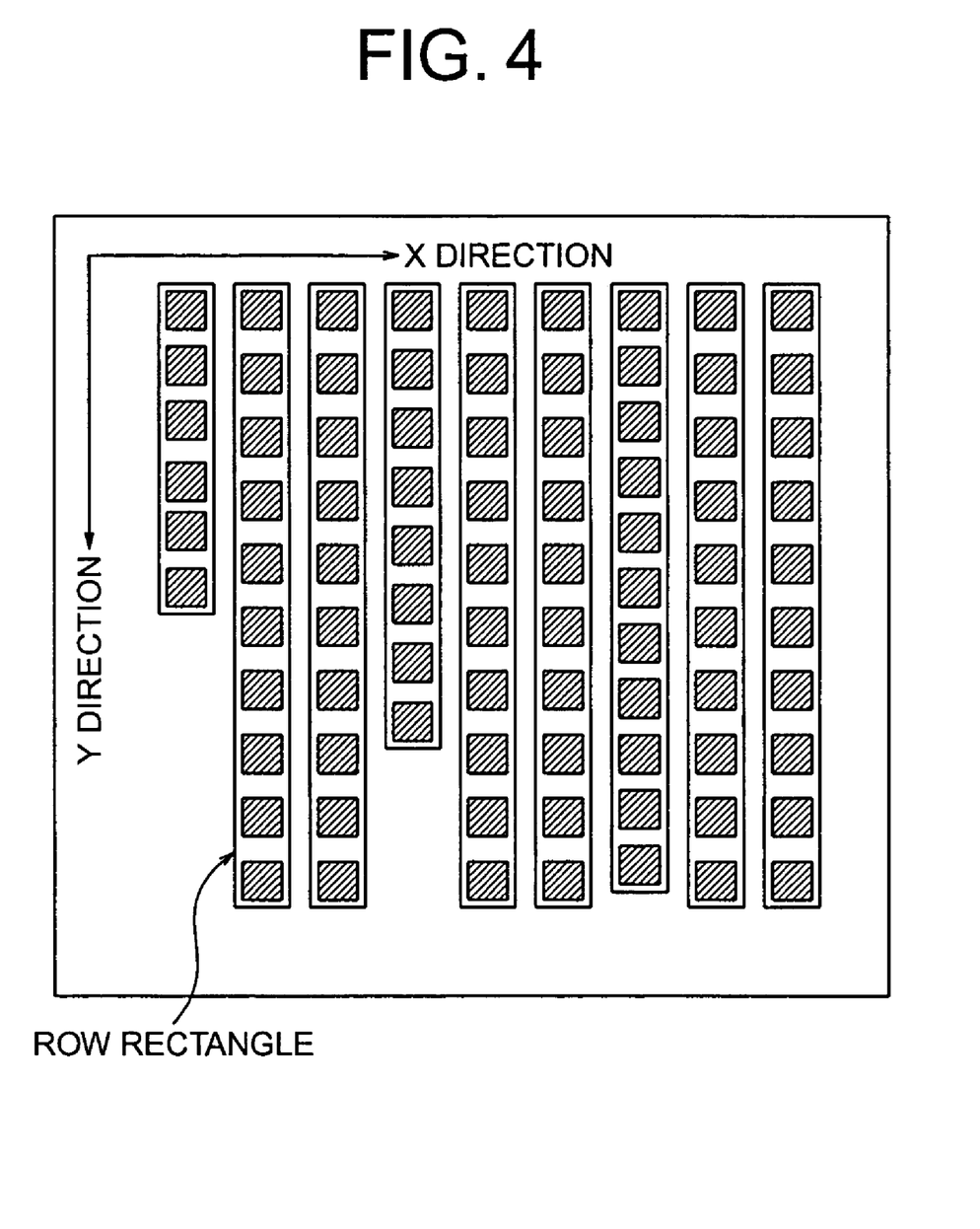
FIG. 4 is an explanatory view of the case in which group bounding rectangles are linearly arranged in the Y direction.

The row extracting process unit 4 determines whether the characters are linearly arranged in the X direction for predetermined intervals of rows as shown in FIG. 3, or linearly arranged in the Y direction as shown in FIG. 4 based on the position information about the group bounding rectangle extracted in the labeling process based on the feature that characters can be linearly arranged in the X direction as shown in FIG. 3, or the characters are linearly arranged in the Y direction as shown in FIG. 4. And, the row extracting process unit 4 extracts the row rectangle information by defining the strings of group bounding rectangles linearly arranged as rows.

Thus, overlap integrating process unit 5 determines the overlap between group bounding rectangles contained in the extracted row rectangle, integrates the groups in which the overlap is detected into one group, and extracts one newly integrated group bounding rectangle.

Figure 5A:
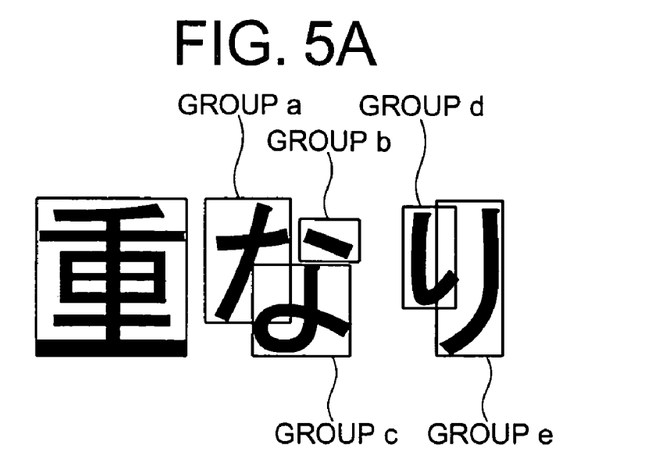
FIGS. 5A, 5B and 5C are an explanatory view of the overlap integrating process.
Figure 5B:
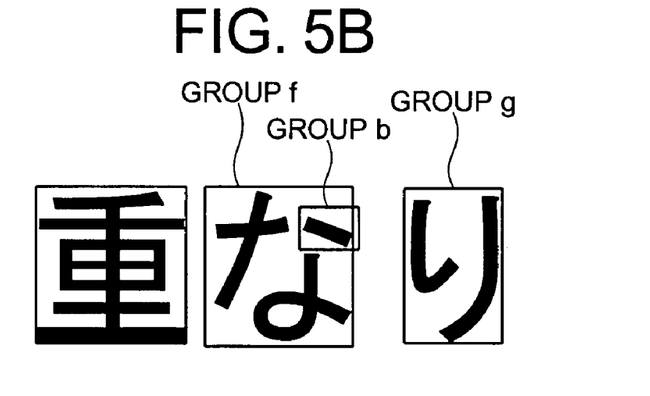
Figure 5C:
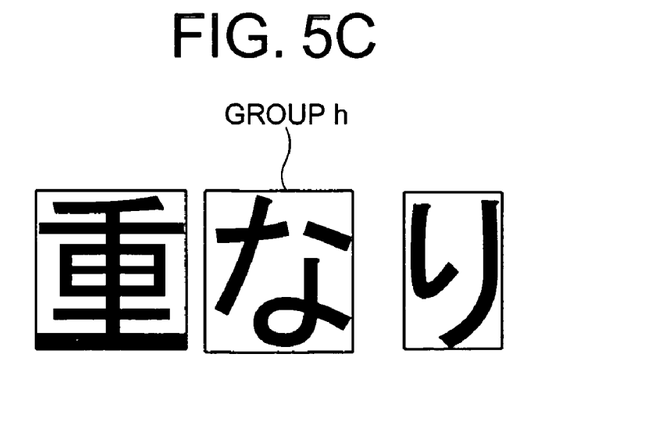

The overlap integrating process is performed as shown in FIG. 5. That is, as shown in FIG. 5, group bounding rectangles are extracted from the three characters, whose originally shapes are shown in FIG. 5C, in the labeling process, and the overlap is determined according to the position information about the group bounding rectangles. These three characters are example images of characters in which lines and dots forming the character are separated each other such as Japanese.

As shown in FIG. 5A, since all black pixels are continuous after labeling the first character, only one group bounding rectangle is extracted. On the other hand, when the second and third characters are labeled, the second character is divided into three groups of the group a, group b and group c. And, among these groups the groups a and c overlap each other. And, the third character is divided into two groups of the group d and group e which overlaps each other.

The overlapping groups are integrated as shown in FIG. 5B. The third character is integrated into single group g. However, the integrated group f and the other group b further overlap in the second character.

The overlap integrating process unit 5 integrates the group obtained by the integration with a further group when they overlap each other to form a group h as shown in FIG. 5C. Thus, the overlap integrating process unit 5 continues integrating groups until no more overlapping group bounding rectangles are detected in the row rectangle.

As described above, the number of obtained group bounding rectangles after performing the overlap integrating process in the row rectangle is assumed to be B, and the number of the group bounding rectangles contained in the row rectangle before performing the overlap integrating process is assumed to be A. Then, the ratio of X of the number of the group bounding rectangles before the overlap integrating process to the number of group bounding rectangles after the overlap integrating process can be obtained by the equation $X=B/A$. The language can be determined by the value of the overlap integration ratio X.

Figure 6A:
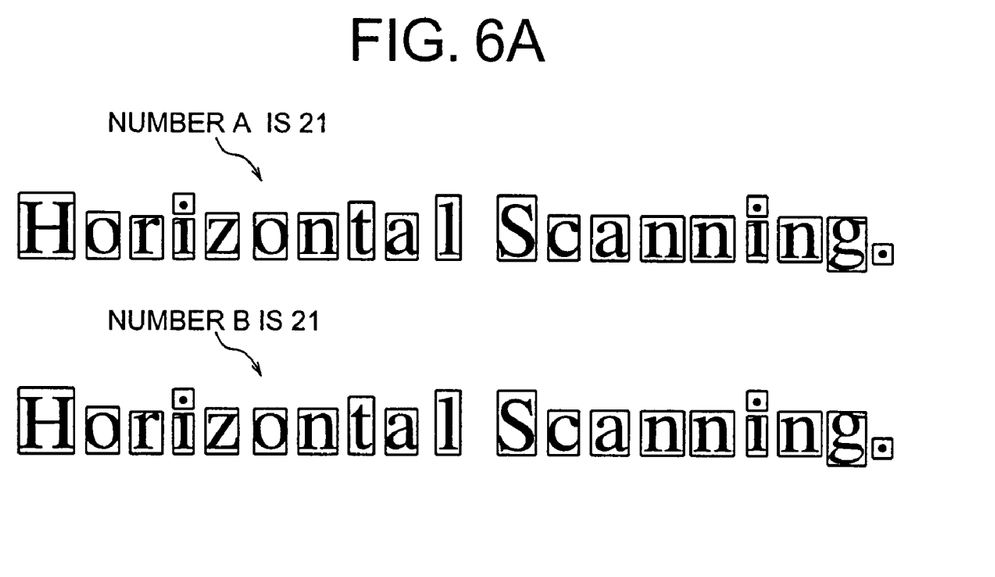
FIGS. 6A and 6B is an explanatory view of the process of obtaining an overlap integration ratio.

As shown in FIG. 6A, in the case of a row of English characters, there are no overlapping group bounding rectangles to be integrated in almost all group bounding rectangles, and the overlap integration ratio X is close to 1.0 according to the statistical data. In FIG. 6A, the number A is 21, and the number B is 21, then the ratio X is 1.0.

Figure 6B:
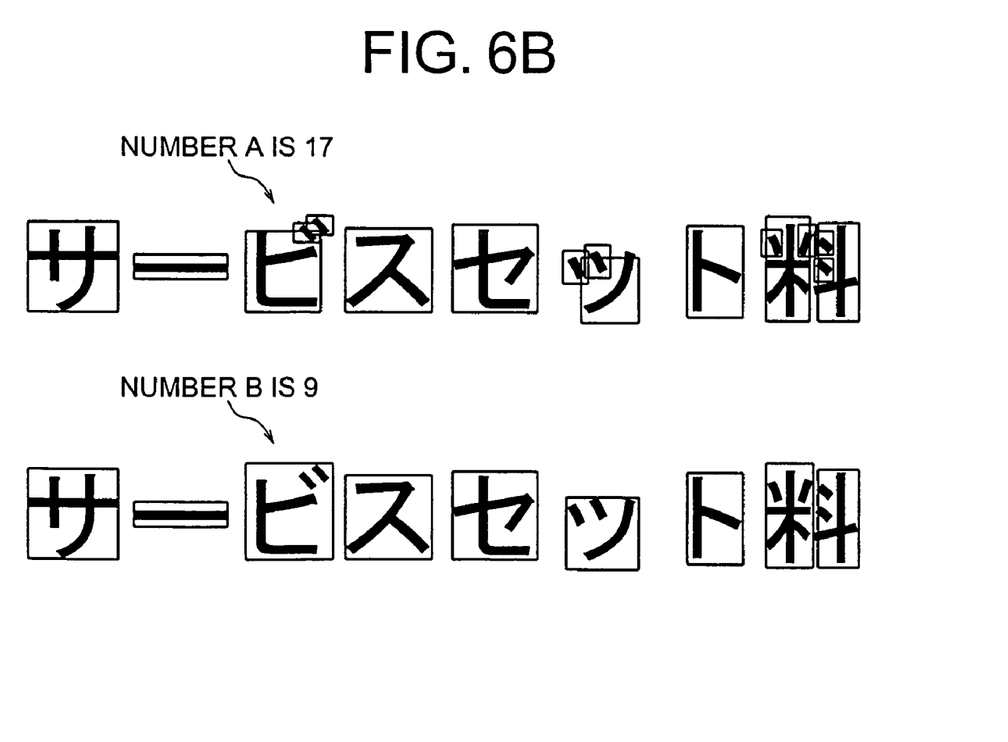

On the other hand, as shown in FIG. 6B, in the case of a row of Japanese characters, there are a number of group bounding rectangles to be treated in the overlap integrating process, and the overlap integration ratio of X is 0.53 which is much smaller than the value for the English characters. In FIG. 6B, the number A is 17, and the number B is 9, then the ratio X is 0.53.

Then, the upper limit of the range of the overlap integration ratio for Japanese is statistically calculated to use the value as threshold. A language determining process unit 6 determines that the language is English when the value is equal to or larger than the threshold, and the language is Japanese when it is smaller than the threshold, thereby correctly determining the language of the character contained in the row rectangle.

When the determination is made on a single row, wrong determination may be made depending on the contents of the characters in the row. Therefore, statistical determination process unit 7 may further be provided. The statistical determination process unit 7 performs the language determining process on a plurality of rows contained in an original, and also a statistical process so that the language determined to be the language of the characters contained in the most rows can be determined as the language of the characters in the original. Thus, the final wrong determination of the language of the character in the original can be suppressed by correcting the wrong determination of the language of single row depending on the characters in the row, and the language can be automatically determined more correctly.

When a document to be read contains only characters, the labeling process, the overlap integrating process, and the language determining process can be performed on the entire original.

According to the present invention, the following effects can be expected.

When characters are recognized using an OCR, etc. in the image reading apparatus for reading a document image containing character information, it is necessary to recognize the characters using the OCR engine for the language of the characters to be recognized. Therefore, the user of the apparatus manually sets the language of the original before reading the image, and the apparatus is not easily operable. To solve the above-mentioned problem, an image reading apparatus has been suggested with a plurality of OCR engines loaded on the apparatus for actually recognizing characters using the plurality of OCR engines, and automatically determining the language of the highest probability of correct recognition as the language of the characters contained in an original. However, in the above-mentioned apparatus, it takes a long time to perform the recognition using the OCR, and perform the preprocess for a read of an image which is performed for automatically determining a language, thereby causing a delay in reading an image. To shorten the processing time, it is preferable to realize the function by hardware, but the character recognizing capability of the OCR for a plurality of languages, etc. cannot be realized by hardware.

According to the present invention, the language of the characters contained in an original can be easily and automatically determined. Furthermore, since the function is not complicated, it can be realized by hardware, and the process can be performed at a higher speed.

What is claimed is:

1. An image reading apparatus for reading an image which contains character information, the apparatus comprising:
    labeling process unit to group a continuous black pixel area forming characters contained in a read black and white monochrome image of two gray levels, and extracting group bounding rectangle information about a grouped continuous black pixel area;

overlap integrating process unit to determine overlap between grouped group bounding rectangles, and integrating overlapping group bounding rectangles; and language determining process unit to obtain an overlap integration ratio of a number of group bounding rectangles integrated in an overlap integrating process to a number of group bounding rectangles before the overlap integrating process, and determining a language from a characteristic of the overlap integration ratio.

2. The image reading apparatus according to claim 1, further comprising:

row extracting process unit to extract row rectangle information from position information about a group bounding rectangle of the continuous black pixel area extracted and grouped by the labeling process unit when a document includes graphics and pictures, wherein the overlap integrating process and the language determining process are performed on a group bounding rectangle contained in a row rectangle extracted by the row extracting process unit.

3. The image reading apparatus according to claim 2, further comprising:

binarizing process unit to binarize multi-valued image data when an image read by an image input device is a multi-valued image such as a color image or a multi-level gray scale image.

4. The image reading apparatus according to claim 3, further comprising:

statistical determination process unit to perform a language determining process of determining a language from the overlap integration ratio on a plurality of rows contained in an original image, and determining in a statistical process a language determined as a language of characters contained in most rows as a language of characters contained in the original image.

5. The image reading apparatus according to claim 2, further comprising:

statistical determination process unit to perform a language determining process of determining a language from the overlap integration ratio on a plurality of rows contained in an original image, and determining in a statistical process a language determined as a language of characters contained in most rows as a language of characters contained in the original image.

6. The image reading apparatus according to claim 1, further comprising:

binarizing process unit to binarize multi-valued image data when an image read by an image input device is a multi-valued image such as a color image or a multi-level gray scale image.

7. The image reading apparatus according to claim 6, further comprising:

statistical determination process unit to perform a language determining process of determining a language from the overlap integration ratio on a plurality of rows contained in an original image, and determining in a statistical process a language determined as a language of characters contained in most rows as a language of characters contained in the original image.

* * * * *